(12) United States Patent
Xiao

(10) Patent No.: US 8,339,774 B2
(45) Date of Patent: Dec. 25, 2012

(54) CONNECTING MECHANISM AND ELECTRONIC DEVICE USING THE SAME

(75) Inventor: Jin-Wei Xiao, Shenzhen (CN)

(73) Assignees: Fu Tai Hua Industry (Shenzhen) Co., Ltd., Shenzhen (CN); Hon Hai Precision Industry Co., Ltd., New Taipei (TW)

(*) Notice: Subject to any disclaimer, the term of this patent is extended or adjusted under 35 U.S.C. 154(b) by 290 days.

(21) Appl. No.: 12/915,071

(22) Filed: Oct. 29, 2010

(65) Prior Publication Data

US 2012/0075779 A1    Mar. 29, 2012

(51) Int. Cl.
*G06F 1/16* (2006.01)

(52) U.S. Cl. ....... 361/679.01; 16/295; 29/846; 417/327; 62/259.2

(58) Field of Classification Search ................ 123/65 V, 123/197.4, 184.56, 190.13; 16/78, 382, 280, 16/223, 366, 367, 319, 295; 361/704, 807, 361/679.01, 679.54, 679.09, 679.08, 679.55, 361/679.58, 679.41, 679.27, 679.21, 679.53, 361/679.06, 679.48, 679.11, 679.56; 340/442, 340/443, 815.42, 635; 29/401.1, 402.08, 29/407.1, 846; 417/255, 257, 379, 415, 378, 417/321, 327; 62/498, 538, 124, 476, 483, 62/654, 184, 259.2; 165/104.33, 104.21, 165/80.2
See application file for complete search history.

(56) References Cited

U.S. PATENT DOCUMENTS 6,969,373 B2 * 11/2005 Schwartz et al. ........ 604/170.03
2012/0192830 A1 * 8/2012 Almassi ........................ 123/200

* cited by examiner

*Primary Examiner* — Hung Duong
(74) *Attorney, Agent, or Firm* — Altis Law Group, Inc.

(57) ABSTRACT

A connecting mechanism includes a first connecting member, a second connecting member, a first conduit and a second conduit. The first connecting member includes a first cylinder and a first piston movably accommodated within the first cylinder to divide the first cylinder into a first space on the one side of the first piston and a second space on the opposite side of the first piston. The second connecting member includes a second cylinder and a second piston movable accommodated within the second cylinder to divide the second cylinder into a third space on the one side of the second piston and a fourth space on the opposite side of the second piston. The first conduit communicates the first space with the third space. The second conduit communicates the second space with the fourth space. An electronic device using the connecting mechanism is also provided.

17 Claims, 4 Drawing Sheets

CONNECTING MECHANISM AND ELECTRONIC DEVICE USING THE SAME

BACKGROUND

1. Technical Field

The present disclosure relates to connecting mechanisms, and more particularly to a connecting mechanism being used in an electronic device.

2. Description of Related Art

An electronic device, such as a mobile phone, generally includes a main body and a cover with a display. The cover is pivotally coupled to the main body by a conventional hinge such that the display can rotate with respect to the main body. However, when the conventional hinge is for an electronic device with two displays, the movements of the displays of the electronic device are limited to the movement of the conventional hinge.

Therefore, there is room for improvement in the art.

BRIEF DESCRIPTION OF THE DRAWINGS

The components of the drawings are not necessarily drawn to scale, the emphasis instead being placed upon clearly illustrating the principles of the embodiments of the connecting mechanism. Moreover, in the drawings, like reference numerals designate corresponding parts throughout several views.

DETAILED DESCRIPTION

Figure 1:
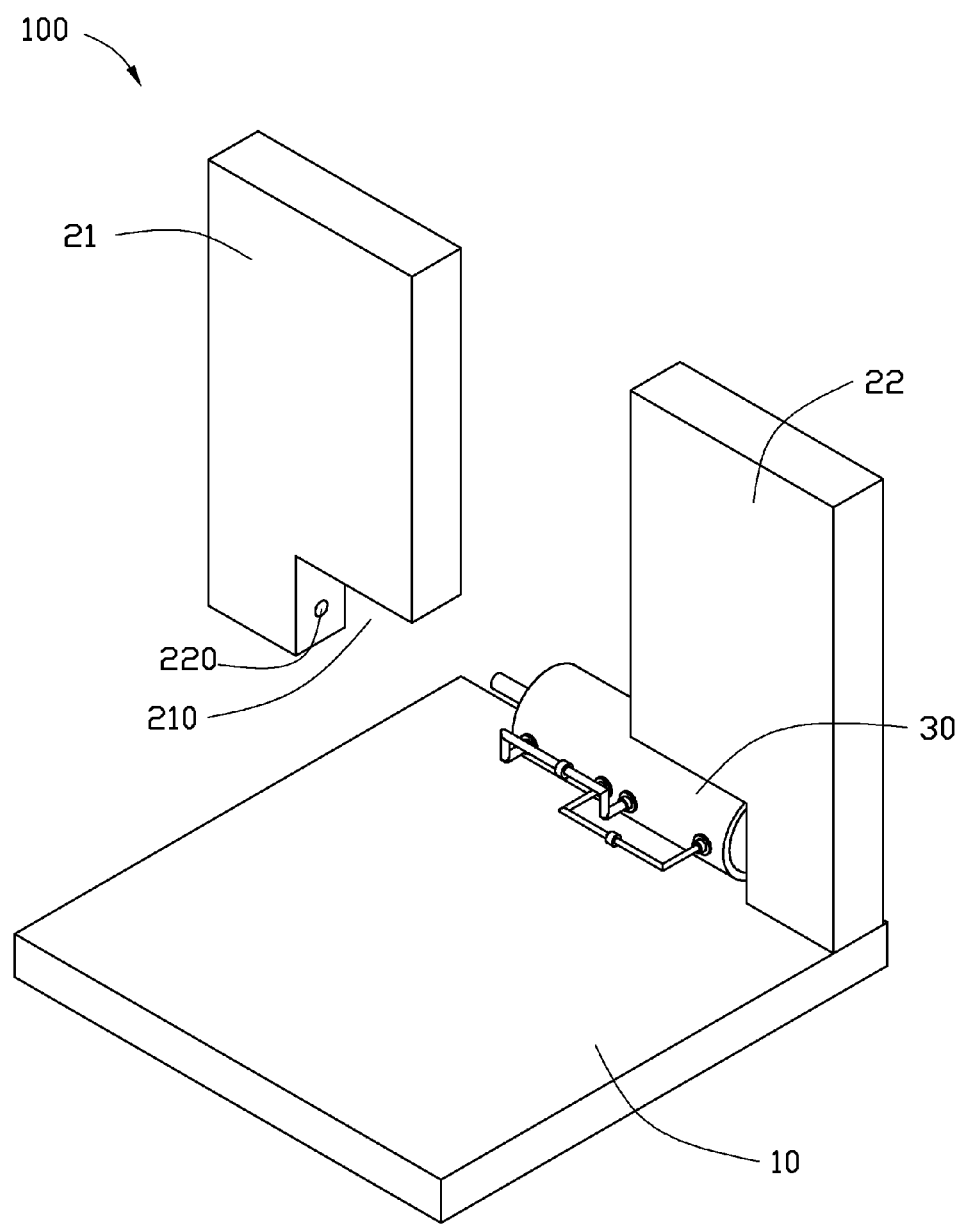
FIG. 1 is a partially disassembled view of an electronic device in accordance with one embodiment, and the electronic device includes a connecting mechanism.

Referring to FIG. 1, an electronic device 100 is shown. The electronic device 100 may be a mobile phone, a PDA, or a notebook computer. The electronic device 100 includes a main body 10, a first display 21, a second display 22, and a connecting mechanism 30 for connecting the first and second displays 21 and 22 to the main body 10.

The main body 10 may be substantially rectangular. The main body 10 is used to accommodate a number of electronic components (not shown) such as a motherboard with necessary electronic components, a power supply, and a hard disk.

The first and second displays 21 and 22 may be substantially rectangular. In the embodiment, the shape and size of the first and second displays 21 and 22 are the same. The first and second displays 21 and 22 respectively define an opening 210 to provide space for the connecting mechanism 30. The first and second displays 21 and 22 further respectively define shaft holes 220 communicating with the corresponding opening 210.

Figure 2:
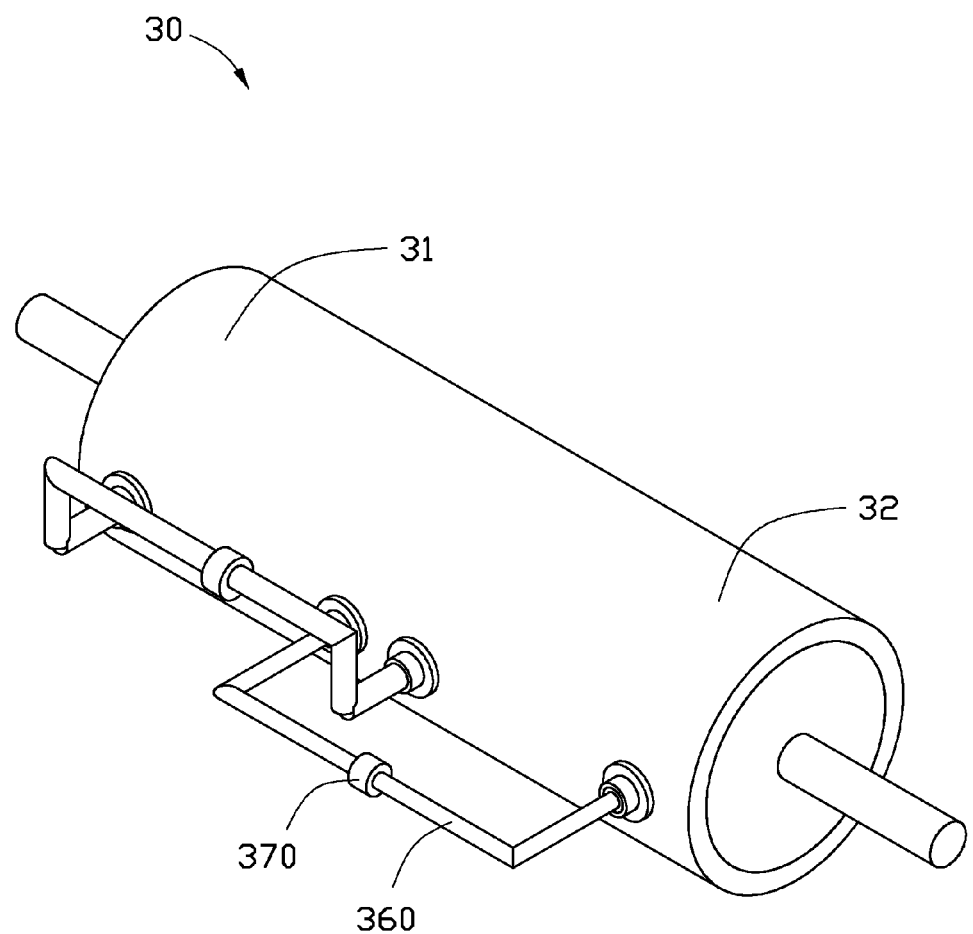
FIG. 2 is a perspective view of the connecting mechanism in FIG. 1.
Figure 3:
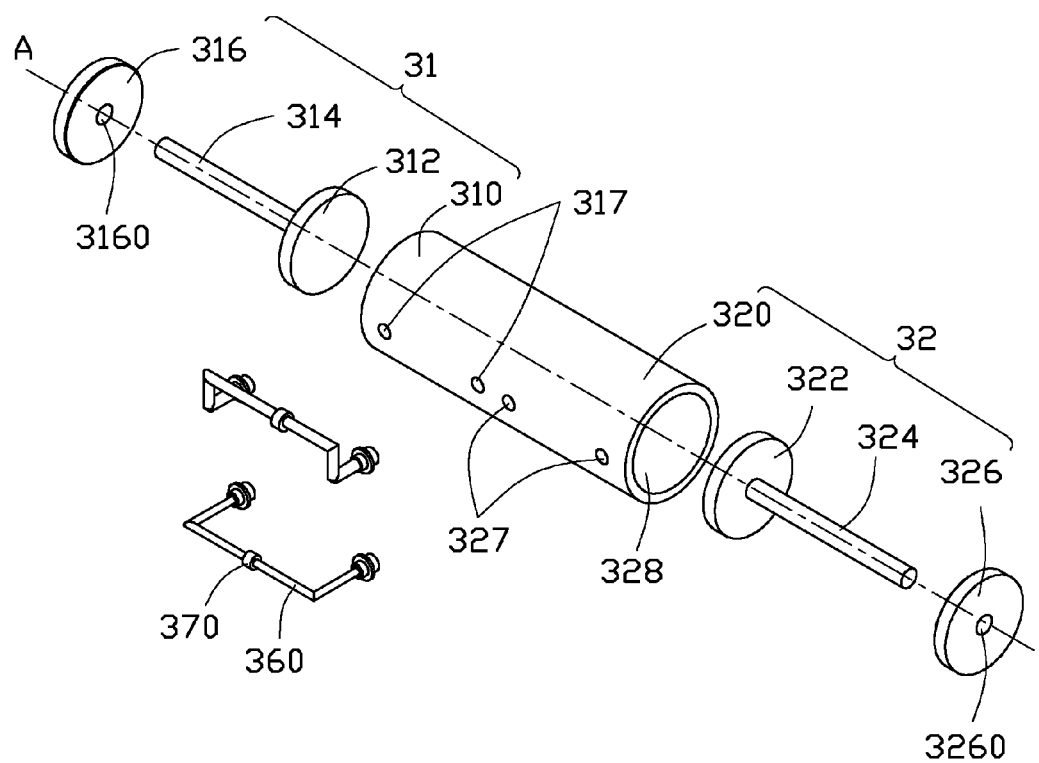
FIG. 3 is a disassembled view of the connecting mechanism in FIG. 2.

Referring also to FIGS. 2 and 3, the connecting mechanism 30 includes a first connecting member 31, a second connecting member 32, and two conduits 360 for communicating the first connecting member 31 and the second connecting member 32. The structure of the first and second connecting members 32 are the same. For simplicity, hereinafter, only the first connecting member 31 is selected to be described in detail.

Figure 4:
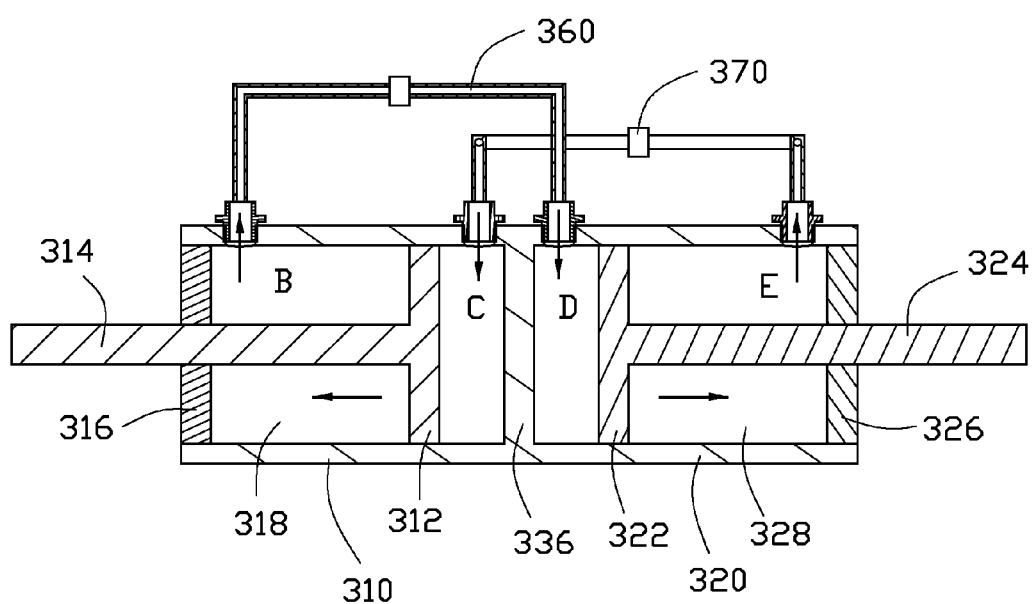
FIG. 4 is a cross-sectional view of the connecting mechanism in FIG. 2.

The first connecting member 31 includes a first cylinder 310, a first piston 312 movably accommodated within the first cylinder 310, a first connecting rod 314 connected to the first piston 312, and two first covers 316,336 (see in FIG. 4).

The first cylinder 310 defines a first receiving space 318 (see in FIG. 4). The first receiving space 318 extends in a direction parallel to the axis A of the first cylinder 310. The first receiving space 318 is to accommodate the first piston 312, the first connecting rod 314, and the two first covers 316. The first cylinder 310 further defines two first holes 317 communicating with the first receiving space 318. The two first holes 317 are respectively arranged adjacent to two covers 316.

The first piston 312 is substantially disk-like. The diameter of the first piston 312 is equal to the inner diameter of the first cylinder 310. The first piston 312 is movably accommodated within the first receiving space 318. In detail, the first piston 312 is slidable in a direction parallel to the axis A, and rotatable around the axis A of the corresponding first cylinder 310.

The first connecting rod 314 is perpendicularly connected to the center of the first piston 312, and an end thereof away from the first piston 312 extends out of the first receiving space 318. The first connecting rod 314 is coaxial to the first cylinder 310. The first connecting rod 314 is used to the drive the first piston 312 to move in the first cylinder 310.

The first covers 316 are also substantially disk-like. The diameter of the first covers 316 is equal to the inner diameter of the first cylinder 310. The first covers 316 are respectively fixed to opposite ends of the first cylinder 310, such that the first receiving space 318 is sealed. The center of one of the first covers 316 defines a through hole 3160 for allowing the corresponding first connecting rod 314 to slide therein. The first receiving space 318 is sealed when the first connecting rod 314 is received in the first through hole 3160.

The second connecting member 32 includes a second cylinder 320, a second piston 322 movably accommodated within the second cylinder 320, a second connecting rod 324 connected to the second piston 322, and two second covers 326, 326. The second cylinder 320 defines a second receiving space 328 and two second holes 327 communicating with the second receiving space 328. The second receiving space 328 accommodates the second cylinder 320, the second piston 322, the second connecting rod 324 and the two second covers 326. One of the second covers 326 defines a second through hole 3260 for allowing the corresponding second connecting rod 324 to slide therein. The second receiving space 328 is sealed when the second connecting rod 324 is received in the second through hole 3260.

In the embodiment, the shape and size of the first and second connecting members 31 and 32 are the same, the first connecting member 31 and the second connecting member 32 are connected with each other with the first and second connecting rods 314 and 324 extending in reverse directions. The first and second cylinders 310 and 320 are constructed integrally and are coaxial. Referring to FIG. 4, the first cover 316 adjacent to the second connecting member 32 and the second cover 326 adjacent to the first connecting member 31 are integrated (hereinafter, the integrated cover 336). In some embodiments, the first connecting member 31 may not be connected with the second member 32, and the shape and size of the first and second connecting members 31 and 32 are different.

The opposite ends of each conduit 360 are respectively fixed to the first and second connecting members 31 and 32. Referring to FIG. 4, in detail, one end of one conduit 360 is fixed to one of the first holes 317, adjacent to the first cover 316 defining the first through hole 3160 and the other end of the one conduit 360 is fixed to one of the second holes 327 away from the second cover 326 defining the second through hole 3260. Similarly, one end of the other conduit 360 is fixed to one of the second holes 327 adjacent to the second cover 326 defining the second through hole 3260 and the other end of the other conduit 360 are fixed to the other first hole 317 away from the first cover 316. Thus, the first receiving space 318 communicates with the second receiving space 328 by the conduits 360.

Furthermore, a valve 370 is arranged at each conduit 360. The valves 370 control the flux of the fluid (not shown) flowing in the first and second receiving spaces 318 and 328.

In assembly, the first and second connecting rods 314 and 324 are respectively fixed to the corresponding first and second pistons 312 and 322, the first and second pistons 312 and 322 slide against two sides of the integrated cover 336. Second, the first and second connecting rods 314 and 324 respectively extend out of the first and second through holes 3160 and 3260. Then, the first and second receiving spaces 314 and 316 are filled with fluid, such as liquid or gas. Finally, the conduits 360 are respectively fixed to the first and second cylinders 310 and 320 by the first and second holes 317 and 327, and the first and second displays 21 and 22 are fixed to the connecting mechanism 30 by accommodating the ends of the first and second connecting rods 314, 324 in the two shaft holes 220.

Referring to FIG. 4, in use, when the first piston 310 slides gradually away from the integrated cover 336, the first receiving space 318 is divided into two spaces B and C, and the fluid in the space B is compressed to flow into the space D of the second receiving space 328 through the conduit 360. As a result, the second piston 322 received in the second receiving space 328 is driven to slide in a reserve direction by the fluid flowing from the space B, and the fluid in space E of the second receiving space 328 flow into the space C of the first receiving space 318 through the conduit 360. Therefore, the first and second displays 21 and 22 fixed to the first and second connecting rods 314 and 324 move away from each other.

When the first piston 312 slides gradually toward the integrated cover 336, the fluid in the space C flows into the space E, and the second piston 322 in the second receiving space 328 is driven to slide toward the integrated cover 336 to drive the fluid in the space D flowing into the space B. Therefore, the first and second displays 21 and 22 fixed to the first and second connecting rods 314 and 324 are moved towards each other.

Furthermore, the first and second pistons 312 and 322 are rotatably received in the first and second receiving spaces 318 and 328, the first and second displays 21 and 22 fixed to the first and second connecting rods 314 and 324 are rotatable relative to the main body 10. Thus the first and second displays 21, 22 can be angled with each other.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A connecting mechanism, comprising:
a first connecting member comprising a first cylinder, a first piston movably accommodated within the first cylinder, and a first connecting rod connected to one side of the first piston, the first connecting rod extending out of the first cylinder and capable of moving with the first piston, the first piston dividing the first cylinder into a first space on the one side of the first piston and a second space on the opposite side of the first piston;
a second connecting member comprising a second cylinder, a second piston movably accommodated within the second cylinder, and a second connecting rod connected to one side the second piston, the second connecting rod extending out of the second cylinder and capable of moving with the second piston, the second piston dividing the second cylinder into a third space on the one side of the second piston and a fourth space on the opposite side of the second piston;
a first conduit communicating the first space with the third space; and
a second conduit communicating the second space with the fourth space.

2. The connecting mechanism of claim 1, wherein the first and second cylinders are constructed integrally and coaxially.

3. The connecting mechanism of claim 1, wherein the first and second pistons are rotatable relative to the first and second cylinders respectively.

4. The connecting mechanism of claim 2, wherein the first and second connecting rods are coaxial, and extend from the first and second pistons in reverse direction.

5. The connecting mechanism of claim 1, wherein the first and second cylinders are filled with fluid.

6. The connecting mechanism of claim 5, wherein at least one of the first conduit and the second conduit defines a valve used to control the flow of the fluid.

7. An electronic device, comprising:
a main body;
a connecting mechanism fixed to the main body; and
two displays connected to opposite ends of the connecting mechanism;
wherein the connecting mechanism comprises:
a first connecting member comprising a first cylinder, a first piston movably accommodated within the first cylinder, and a first connecting rod connected to one side of the first piston, the first connecting rod extending out of the first cylinder and capable of moving with the first piston, the first piston dividing the first cylinder into a first space on the one side of the first piston and a second space on the opposite side of the first piston;
a second connecting member comprising a second cylinder, a second piston movably accommodated within the second cylinder, and a second connecting rod connected to one side the second piston, the second connecting rod extending out of the second cylinder and capable of moving with the second piston, the second piston dividing the second cylinder into a third space on the one side of the second piston and a fourth space on the opposite side of the second piston;
a first conduit communicating the first space with the third space; and
a second conduit communicating the second space with the fourth space.

8. The electronic device of claim 7, wherein the first and second cylinders are constructed integrally and coaxially.

9. The electronic device of claim 8, wherein the first and second connecting rods are coaxial, and extend from the first and second pistons in reverse direction.

10. The electronic device of claim 9, wherein the two displays are fixed to ends of the first and second connecting rods away from the first and second pistons.

11. The electronic device of claim 7, wherein the first and second cylinders are filled with fluid.

12. The electronic device of claim 11, wherein the first conduit and the second conduit define a valve, the valve is used to control the flow of the fluid.

13. A connecting mechanism, comprising:
- a first sealed receiving space;
- a second sealed receiving space separated from the first sealed receiving space;
- a first piston member received in the first sealed receiving space and partially protruding out of the first sealed receiving space, the first piston member dividing the first sealed receiving space into a first space and a second space; and
- a second piston member received in the second sealed receiving space and partially protruding out of the second sealed receiving space the second piston member dividing the second sealed receiving space into a third space and a fourth space;
- wherein the first space is capable of communicating with the third space; and the second space is capable of communicating with the fourth space.

14. The connecting mechanism of claim 13, wherein the first and second piston members are rotatably received in the first and second sealed receiving spaces.

15. The connecting mechanism of claim 14, wherein each first and second piston members comprising a piston and a connecting rod fixed to the center of the piston, the pistons is slidably received in the first and second sealed receiving spaces, an end of each connecting rods away from the corresponding piston extends out of the first and second sealed receiving spaces.

16. The connecting mechanism of claim 13, further comprising two conduits, one of the conduits is used to communicate the first space with the third space, and the other conduit is used to communicate the second space with the fourth space.

17. The connecting mechanism of claim 16, wherein the first and second sealed receiving spaces are filled with fluid.

* * * * *

UNITED STATES PATENT AND TRADEMARK OFFICE
CERTIFICATE OF CORRECTION

PATENT NO. : 8,339,774 B2
APPLICATION NO. : 12/915071
DATED : December 25, 2012
INVENTOR(S) : Jin-Wei Xiao Page 1 of 1

It is certified that error appears in the above-identified patent and that said Letters Patent is hereby corrected as shown below:

On the title page, insert the following:

--(30)   Foreign Application Priority Data
Sep. 24, 2010   (CN)   2010 1 0289407--

Signed and Sealed this
Twenty-sixth Day of November, 2013

Margaret A. Focarino
*Commissioner for Patents of the United States Patent and Trademark Office*